United States Patent [19]
Parady

[11] Patent Number: 6,006,320
[45] Date of Patent: Dec. 21, 1999

[54] PROCESSOR ARCHITECTURE WITH INDEPENDENT OS RESOURCES

[75] Inventor: Bodo K Parady, Danville, Calif.

[73] Assignee: Sun Microsystems, Inc., Palo Alto, Calif.

[21] Appl. No.: 09/234,584

[22] Filed: Jan. 21, 1999

Related U.S. Application Data

[63] Continuation of application No. 08/675,628, Jul. 1, 1996.

[51] Int. Cl.$^6$ ...................................................... G06F 15/00
[52] U.S. Cl. .............................. 712/36; 712/34; 712/227; 712/229
[58] Field of Search .................................. 712/1, 12, 23, 712/28, 32, 36, 34, 42, 205, 200, 214, 208, 216, 221, 227, 229, 222, 223; 395/701, 712; 709/1, 3, 9

[56] References Cited

U.S. PATENT DOCUMENTS

| | | | |
|---|---|---|---|
| 4,860,191 | 8/1989 | Nomura et al. .......................... | 710/110 |
| 5,465,373 | 11/1995 | Kahle et al. ............................. | 712/215 |
| 5,509,130 | 4/1996 | Trauben et al. ......................... | 712/215 |
| 5,560,028 | 9/1996 | Sachs et al. .............................. | 712/23 |
| 5,669,011 | 9/1997 | Alpert et al. ............................. | 712/23 |
| 5,678,016 | 10/1997 | Eisen et al. ............................. | 712/216 |
| 5,694,565 | 12/1997 | Kahle et al. ............................. | 712/216 |

Primary Examiner—Larry D. Donaghue
Attorney, Agent, or Firm—Townsend and Townsend and Crew LLP

[57] ABSTRACT

A processor that includes hardware resources for the operating system that are separate and independent from resources dedicated to user programs. The OS resources preferably include a separate OS arithmetic logic unit (OS/ALU) along with a dedicated instruction buffer, instruction cache and data cache. The OS/ALU is preferably able to control the registers and program address of user processes, and can read a program request register from the user program.

9 Claims, 3 Drawing Sheets

PROCESSOR ARCHITECTURE WITH INDEPENDENT OS RESOURCES

This application is a continuation of Ser. No. 08/675,628, filed Jul. 1, 1996.

BACKGROUND OF THE INVENTION

The present invention relates in general to microprocessors, and in particular to operating system context switching.

As the master control program that runs the computer, the operating system (OS) periodically interrupts the user process to, for example, schedule tasks and manage resources. The interrupt is typically accomplished by having a clock interrupt every 1/100th of a second to query whether the operating system needs to do anything. As microprocessor clock speeds have increased, the amount of overhead and housekeeping done by the operating system has also increased, and thus the net percentage of time required for these operating system tasks has not been significantly reduced.

In addition to the increased amount of work done by the operating system, other factors have combined to increase the intrusion of the operating system on user programs. For example, the use of multi-tasking, where multiple programs are run in parallel with frequent context switches between them, requires more interruptions for the operating system to handle the context switch. In addition, processor clock speeds have increased much more dramatically than memory access speeds. Thus, memory accesses use up an increasingly larger number of processor cycles as the gap between processor clock speed and memory access speed increases. Context switches between an operating system and user programs, or between user programs, often require a number of memory accesses.

Context switching upon an interrupt to the operating system or a switch between tasks requires a number of tasks. In particular, the state of the necessary registers used by the execution unit need to be saved to memory. For a pipelined processor, instructions in the pipeline need to propagate through the pipeline to empty the pipeline before the context switch can occur. As the pipeline grows deeper, the length of time required for this correspondingly increases.

In addition, the operating system activities require operating system specific instructions and data which must be stored in the instruction and data caches. This not only consumes cache space that would otherwise be allocated to user applications, it would also cause the overwriting of user instructions and data, thus increasing the chances of a cache miss on a subsequent return to the user process. This effectively limits the available memory bandwidth for user applications.

User performance degradation caused by the OS context switch is a more severe problem in multi-processor systems. In such systems, a holdup by one processor due to OS activity may delay a group of other processors that are tightly synchronized over well defined workloads. The OS interferences with the user process creates user process inconsistency such that the same user program may take up different amounts of time to execute at different times. This inconsistency does not permit the operating system to efficiently schedule and distribute tasks among the various processors operating in parallel. Thus, programs that may take longer to execute are scheduled to run in parallel with smaller sized tasks, where the speed is limited by the slowest processor.

Another concern raised by OS context switching is OS security. In the existing processor architectures, the cache memory typically includes mixed user and OS spaces. After an OS interrupt occurs, the cache may contain sensitive OS data. A cache flush by a subsequent user may expose secure operations executed by the OS (e.g., decoding a password or a secure instruction) to a user process.

There is therefore a need to reduce or eliminate the loss of time and memory bandwidth to operating system overhead, to improve user process consistency, and to provide a more secure operating system.

SUMMARY OF THE INVENTION

The present invention provides a processor that includes hardware resources for the operating system that are separate and independent from resources dedicated to user programs. The OS resources preferably include a separate OS arithmetic logic unit (OS/ALU) along with a dedicated instruction buffer, instruction cache and data cache. The OS/ALU is preferably able to control the registers and program address of user processes, and can read a program request register from the user program.

The separate OS resources operate with the rest of the resources within the processor such that the user process preferably never sees an OS interrupt. All interrupts and I/O pointers are handled by the OS resources that continuously process the OS instruction stream even as the user is using all the resources available to it. The present invention thus eliminates most of the inefficiencies caused by context switching. The separate OS cache eliminates the cache pollution problem and frees up memory bandwidth that is available to the user. Since many of the operations that were triggered by the OS context switch are no longer necessary, user process consistency is significantly improved. The overall performance of the processor is thus substantially improved.

Accordingly, in one embodiment, the present invention provides a computer processor that includes both standard processing resources and separate operating system processing resources. The standard processing resources include an arithmetic logic unit (ALU), a branch unit, a floating point unit, register files, instruction cache and data cache coupled together by a bus network. The operating system processing resources include a second ALU, a second instruction cache, a second data cache, a second register file and a separate load and store unit.

DESCRIPTION OF THE PREFERRED EMBODIMENT

Figure 1:
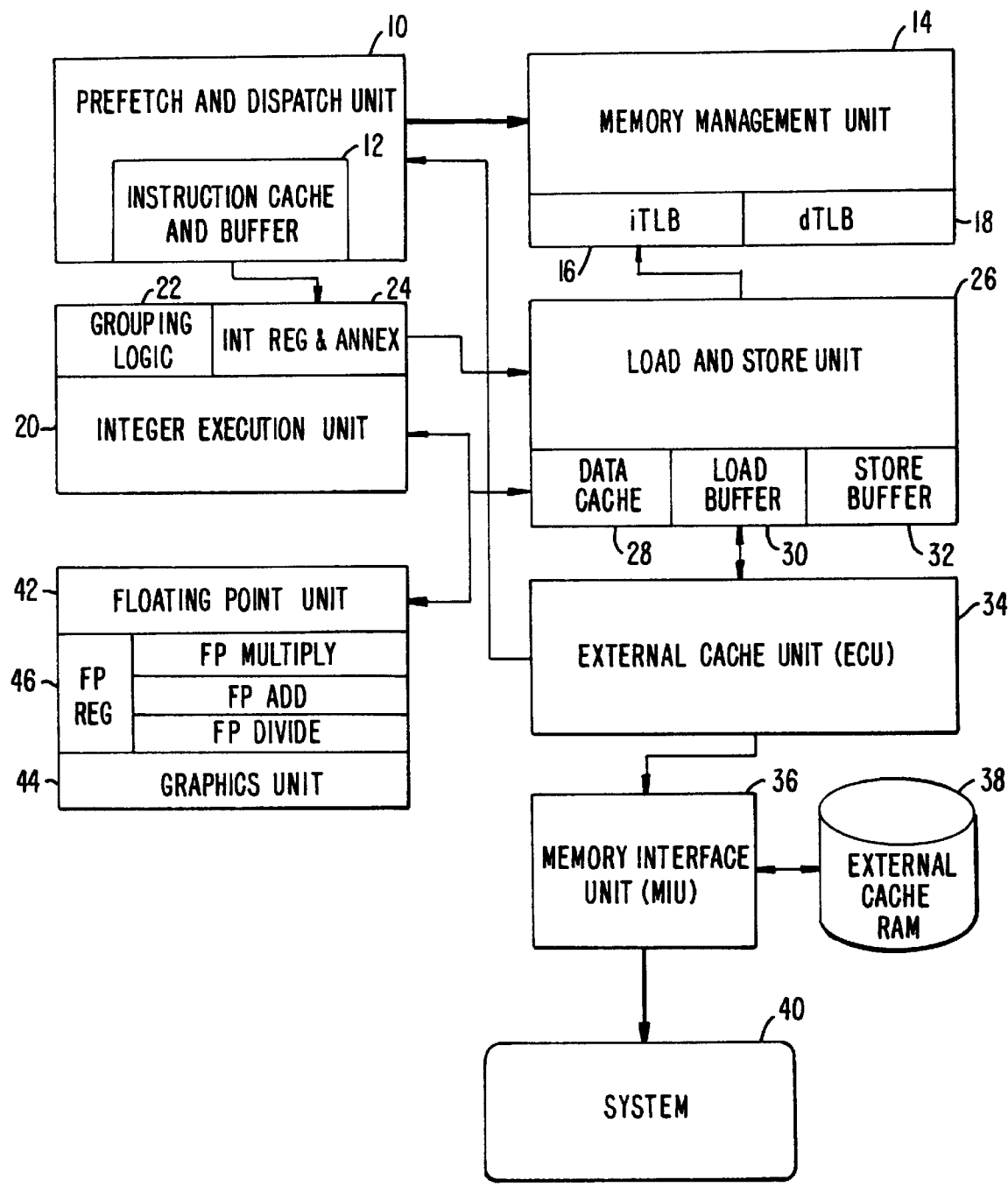
FIG. 1 is a block diagram of pertinent aspects of one prior art processor, the Ultrasparc™ CPU.

FIG. 1 illustrates a prior microprocessor which includes a prefetch and dispatch unit 10 connected to an instruction cache and instruction buffer 12. Also included, is a memory management unit 14 connected to an instruction translation look-aside buffer (TLB) 16 and a data TLB 18. Instructions are provided to an integer execution unit 20 which includes grouping logic 22 and an integer register file 24. A separate load and store unit 26 retrieves data and includes its own data cache 28 along with a load buffer 30 and a store buffer 32. An external cache unit 34 manages connections to a memory interface unit 36, which connects to an external, second level cache 38 and a system bus 40 connected to main memory. In addition, other processing units, such as floating point unit 42 and graphics unit 44 with a shared register file 46 are shown.

Figure 2:
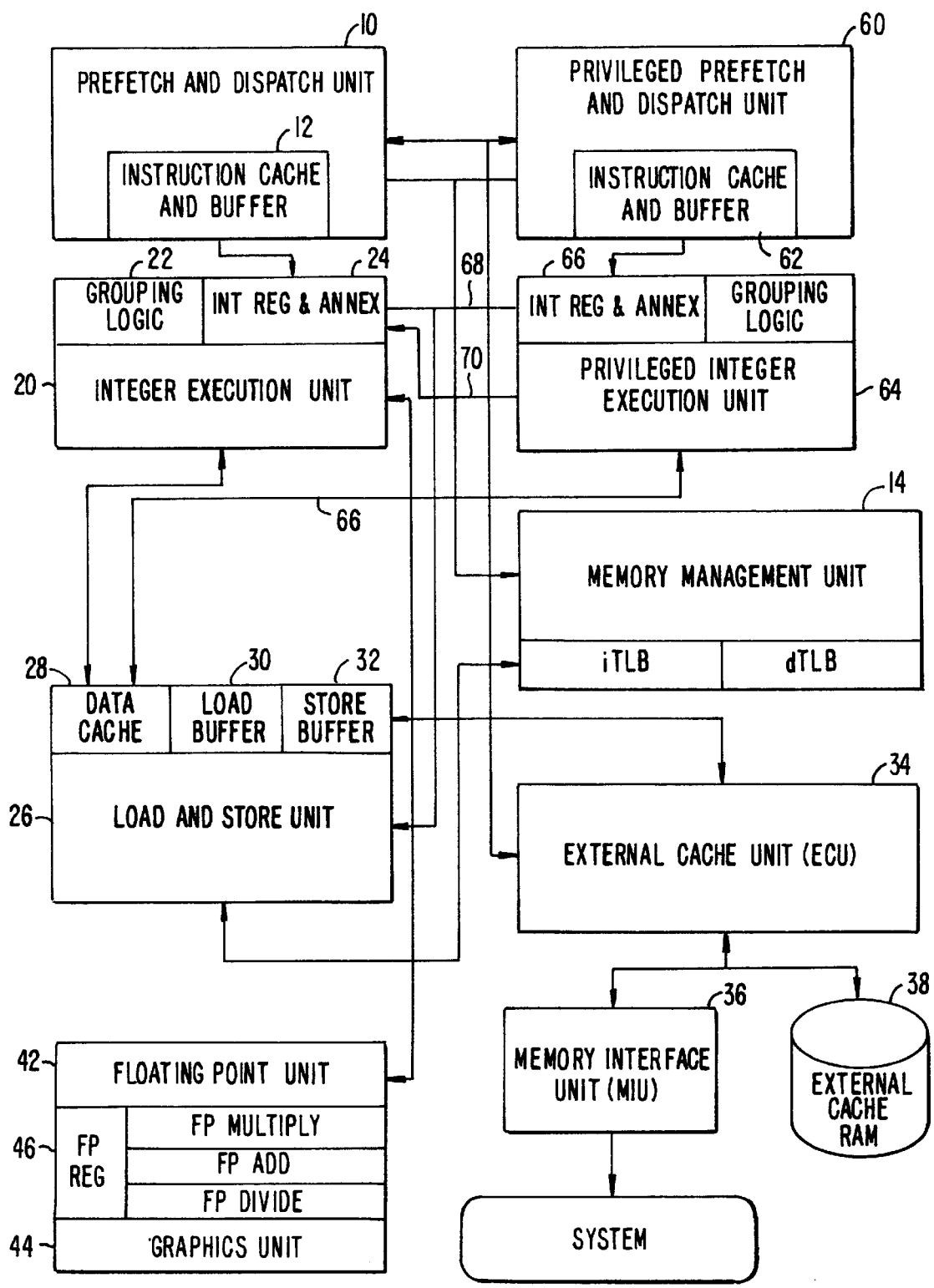
FIG. 2 is a block diagram of one embodiment of the present invention adding a separate operating system prefetch unit, instruction cache and buffer, and integer execution unit.

FIG. 2 illustrates the system of FIG. 1 modified to include the unique, dedicated hardware resources for the operating system in accordance with the present invention. A separate, privileged (operating system) prefetch and dispatch unit 60 is added, with its own instruction cache and instruction buffer 62. In addition, a separate, privileged integer execution 64 is added, which includes its own integer register file 66. In this embodiment, the data cache 28 also used by the integer execution unit is shared with the new integer execution unit 64 as illustrated by access lines 66. Control and read lines 68 and 70 allow privileged integer execution unit 64 to control the registers and program address of integer execution unit 20, as well as read a program request register. As can be seen, there are no separate lines connected to floating point unit 42, since the simplified integer execution unit 64 need not contain this complexity.

The main reasons for communication between the two integer execution units are for (1) flushing registers and/or the cache, (2) stopping or starting instructions, and (3) restoring register and cache data. These control signals can either be sent directly, or could be sent over a system bus.

Figure 3:
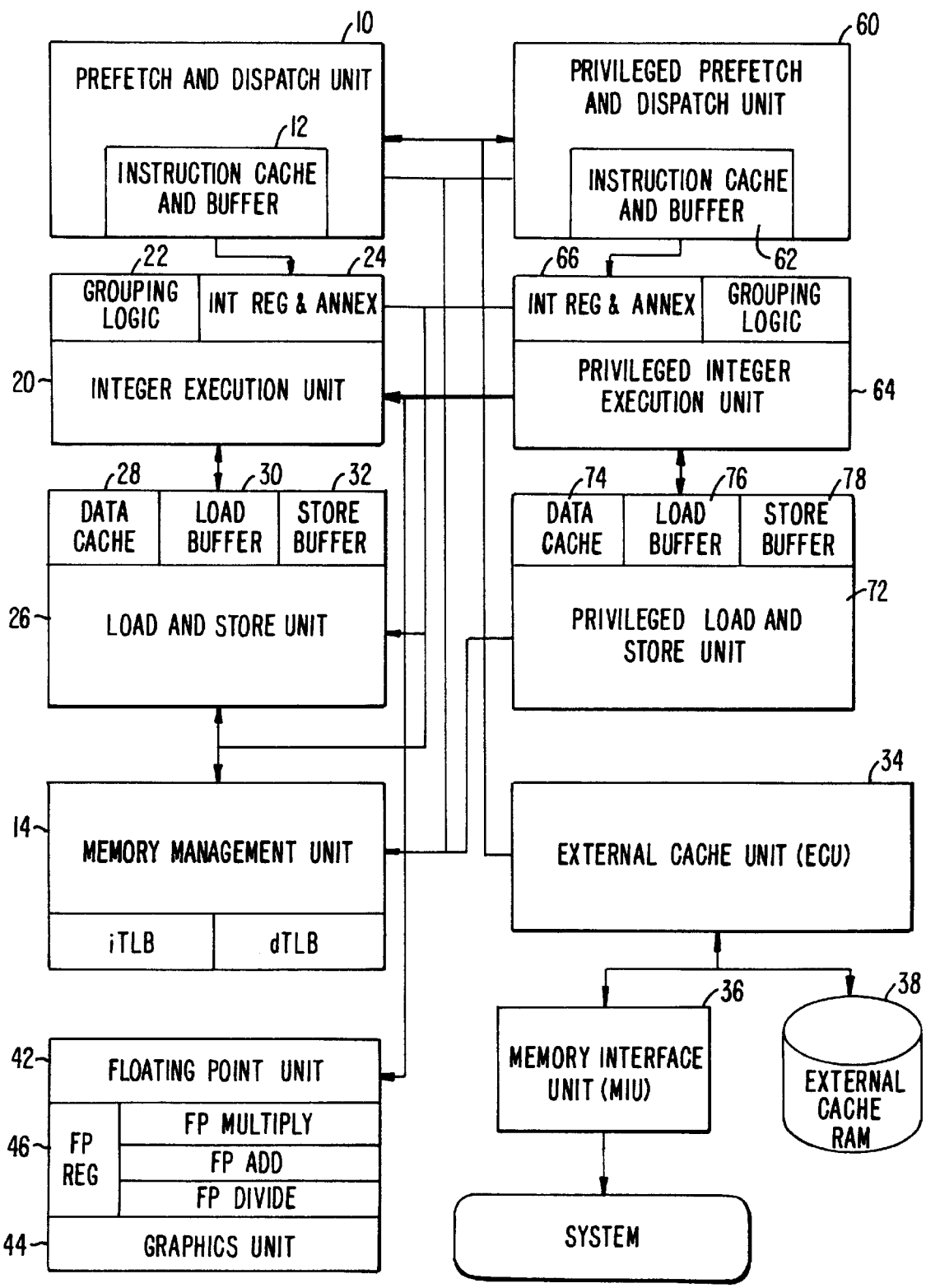
FIG. 3 is a block diagram of an alternate embodiment of the present invention which also adds a separate load and store unit for the operating system.

FIG. 3 shows an alternate embodiment of the present invention which also includes a separate, privileged load and store unit 72 for the operating system. This allows the elimination of lines 66 of FIG. 2, since there is no longer a need to share the load and store unit with the user programs. In addition, a separate data cache 74, load buffer 76 and store buffer 78 are included. This further limits the chances for conflict between the operating system and the user programs at the expense of slightly more silicon area. Conflicts in using the data cache are eliminated, along with allowing parallel load and store operations with separate load and store buffers from those used by the user programs.

In one embodiment, the OS hardware can operate at a different clock speed which is appropriate for the type of instructions it is handling.

The present invention not only eliminates the conflict for resources for housekeeping functions performed by the OS, it also shortens the time required for context switching in a multi-tasking environment. The OS does not need the same hardware for its context switching tasks, and thus its context switch functions can be performed before, after, or in parallel with the context switch.

In most systems, exceptions (program generated events other than branches) are treated the same as interrupts (externally generated events) in that a change in control flow is generated. In one embodiment of the present invention, exceptions transfer control to the OS, or, for some exceptions, cause an OS routine to be performed concurrently with the user program performing other tasks while waiting for the exception to be resolved.

In an alternate embodiment, the user program with its libraries handles all exceptions. All interrupts are handled by the OS or privileged processor. Depending on the interrupt, the user program may continue, be halted, or redirected by the OS processor. It is the first resolution that allows better user program performance and simpler design.

Exceptions are handled by setting the address in the exception program counter (EPC) to the offending instruction and then transferring to a program library supplied in the user address space. If the target does not exist, then an OS trap or interrupt is taken. In any case, the exception vector is provided to handle the error.

The OS can generate context switches, program exceptions, and terminations in the user program. The user program, on the other hand, has no need to examine OS memory or cache space. All data accessible to the user must be permitted by the OS.

As will be understood by those of skill in the art, the present invention may be embodied in other specific forms without departing from the spirit or essential characteristics thereof. Accordingly, the foregoing description is intended to be illustrative, but not limiting, of the scope of the invention which is set forth in the following claims.

What is claimed is:

1. A microprocessor comprising:
 a first prefetch and dispatch unit;
 a first instruction buffer connected to said first prefetch and dispatch unit;
 a first instruction cache connected to said first instruction buffer;
 a data cache;
 a first integer execution unit connected to said first prefetch and dispatch unit;
 a second, privileged prefetch and dispatch unit configured to accept only operating system instructions;
 a second, privileged instruction buffer connected to said second, privileged prefetch and dispatch unit configured to accept only operating system instructions;
 a second, privileged instruction cache connected to said second, privileged instruction buffer and configured to accept only operating system instructions;
 a second, privileged integer execution unit connected to said second, privileged prefetch and dispatch unit, configured to execute only operating system instructions;
 such that operating system instructions are processed in said second, privileged integer execution unit in parallel with the execution of program instructions in said first integer execution unit, eliminating the need for context switches to execute said operating system instructions.

2. The microprocessor of claim 1 further comprising:
 a first data cache for program instructions; and
 a second data cache for only operating system instructions.

3. The microprocessor of claim 1 further comprising:
 a first register file coupled to said first execution unit; and
 a second register file coupled to said second execution unit.

4. The microprocessor of claim 1 further comprising:
 a floating point unit coupled to said first integer execution unit; and
 wherein said second, privileged integer execution unit is not coupled to said floating point unit.

5. The microprocessor of claim 1 further comprising:
 interrupt logic configured to provide interrupt requests to said second execution unit.

6. The microprocessor of claim 5 further comprising:
 first control lines extending from said second execution unit to a program address register of said first execution unit; and second control lines extending from said second execution unit to a register file coupled to said first execution unit.

7. The microprocessor of claim 1 wherein said first execution unit includes a read line coupled to a program request register coupled to said first execution unit.

8. A computer system comprising:

a memory;

a bus coupled to said memory;

a microprocessor coupled to said bus, said microprocessor including a first prefetch and dispatch unit;

a first instruction buffer connected to said first prefetch and dispatch unit;

a first instruction cache connected to said first instruction buffer;

a data cache;

a first integer execution unit connected to said first prefetch and dispatch unit;

a second, privileged prefetch and dispatch unit configured to accept only operating system instructions;

a second, privileged instruction buffer connected to said second, privileged prefetch and dispatch unit configured to accept only operating system instructions;

a second, privileged instruction cache connected to said second, privileged instruction buffer and configured to accept only operating system instructions;

a second, privileged integer execution unit connected to said second, privileged prefetch and dispatch unit, configured to execute only operating system instructions;

such that operating system instructions are processed in said second, privileged integer execution unit in parallel with the execution of program instructions in said first integer execution unit, eliminating the need for context switches to execute said operating system instructions.

9. A method for operating a microprocessor comprising the steps of:

providing a first execution unit for executing user program instructions;

providing a second, privileged execution unit for executing operating system instructions; and dispatching operating system instructions to said second execution unit, having second resources duplicative of first resources in said first execution unit, and dispatching user program instructions to said first execution unit;

such that operating system instructions are processed in said second, privileged integer execution unit in parallel with the execution of program instructions in said first integer execution unit, eliminating the need for context switches to execute said operating system instructions.

* * * * *